United States Patent [19]

Chak et al.

[11] Patent Number: 4,874,496
[45] Date of Patent: Oct. 17, 1989

[54] DEVICE FOR SILVERIZING DRINKING WATER

[76] Inventors: Maryan Chak; Alexander Chak, both of 2901 Ocean Pkwy., Brooklyn, N.Y. 11235

[21] Appl. No.: 294,381
[22] Filed: Jan. 6, 1989
[51] Int. Cl.⁴ .......................... C25B 9/00; C25B 15/00
[52] U.S. Cl. .................................... 204/229; 204/241; 204/274; 204/269
[58] Field of Search ................ 204/241, 274, 229, 269

[56] References Cited

U.S. PATENT DOCUMENTS 3,637,468  1/1972  Icxi et al. .................... 204/274 X
4,152,238  5/1979  Okazaki ........................ 204/241 X
4,206,018  6/1980  Kreisel et al. ................ 204/241 X
4,451,341  5/1984  Miller .......................... 204/229 X
4,710,282  12/1987 Chak et al. ................... 204/229 X Primary Examiner—Donald R. Valentine
Attorney, Agent, or Firm—Ilya Zborovsky

[57] ABSTRACT

A device for silverizing water has a plurality of electrodes including silver electrodes so that a passing water is saturated with silver ions, and a temperature maintaining unit with cooling and heating elements to maintain a required temperature and silver ions saturation of water.

11 Claims, 3 Drawing Sheets

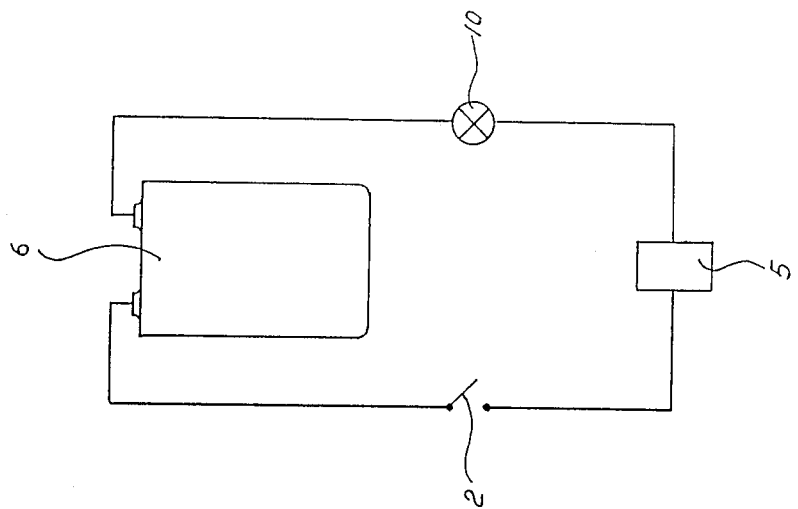
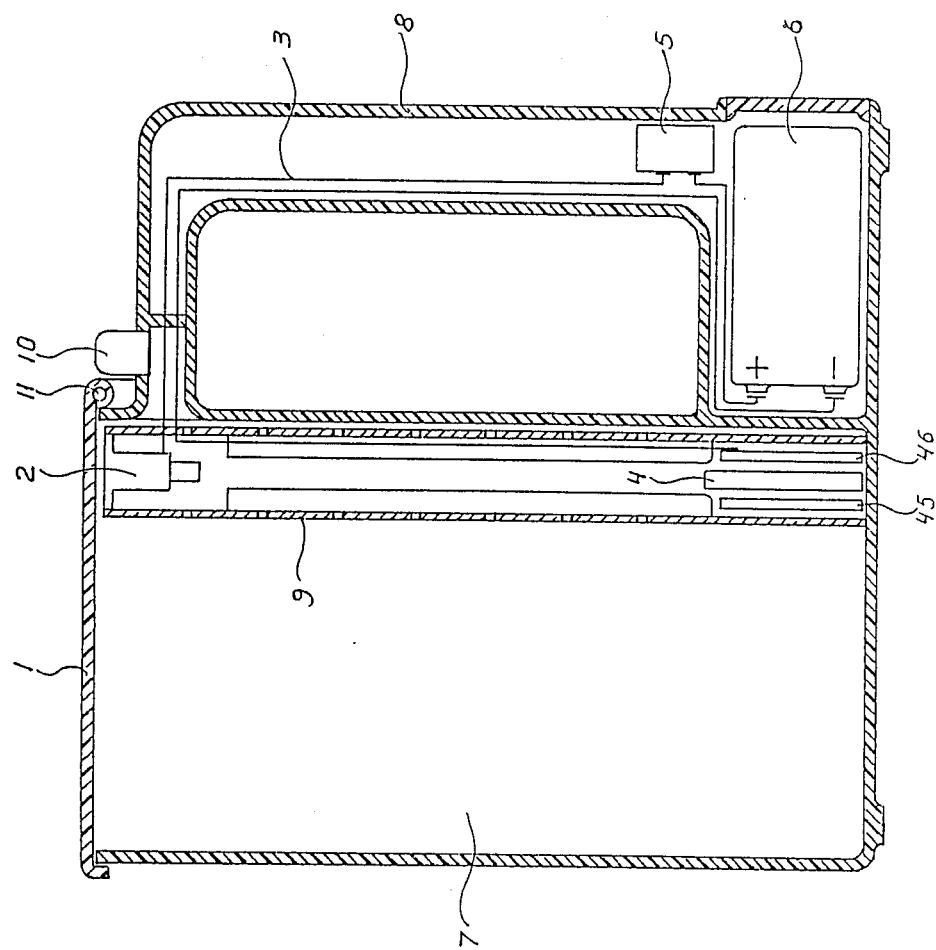

DEVICE FOR SILVERIZING DRINKING WATER

BACKGROUND OF THE INVENTION

The present invention relates to a device for silverizing water.

Devices of the above mentioned general type are known. The known devices include silver electrodes and a water passage formed so that during activation of the electrodes the water is saturated with silver ions which have a string bactericidal action. Thus the water is cleaned of bacteria, viruses,etc. and can be used for drinking. The device can be installed even on a faucet of tap water. The known devices however possess some disadvantages in the sense of providing an automatic operation and insuring a stable and desired degree of silver ions saturation.

SUMMARY OF THE INVENTION

Accordingly it is an object of the present invention to provide a device for silverizing water which operates automatically and provides a desired silver ions saturation of water.

In keeping with these objects and with others which will become apparent hereinafter, one feature of the present invention resides, briefly stated, in a device for silverizing water which has a plurality of electrodes supplied with electric current, water inlet and outlet means arranged to direct water alternatingly past the electrodes, and means for maintaining a desired water temperature in the device, and a silver concentration.

It is another feature of the invention to provide a device in which first portions of water are drained without being silverized.

It is a further feature of the invention to provide a cup-shaped device which utilized a float-like activator and can also be provided with the temperature stabilizing or maintaining means.

The novel features of the present invention are set forth in the appended claims. The invention itself however both as to its construction and its method of operation will be best understood from the following description of preferred embodiment which is accompanied by the following drawings.

BRIEF DESCRIPTION OF THE DRAWINGS

FIG.4 shows a device in accordance with another embodiment of the present invention; and FIG. 5 shows an electrical diagram of the device of FIG.4.

DESCRIPTION OF PREFERRED EMBODIMENTS

Figure 1:
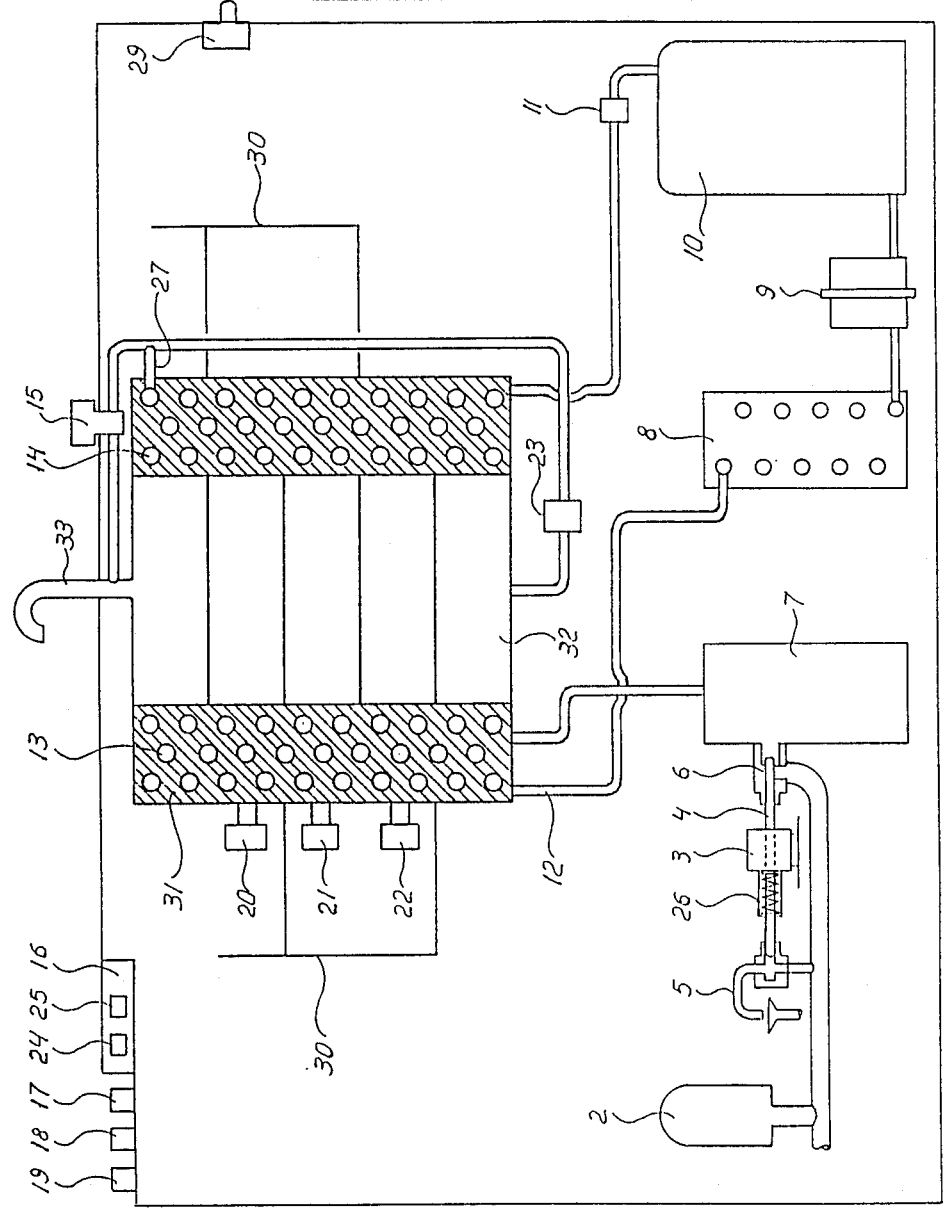
FIG. 1 is a schematic view of a silverizing device of a first embodiment of the invention.
Figure 2:
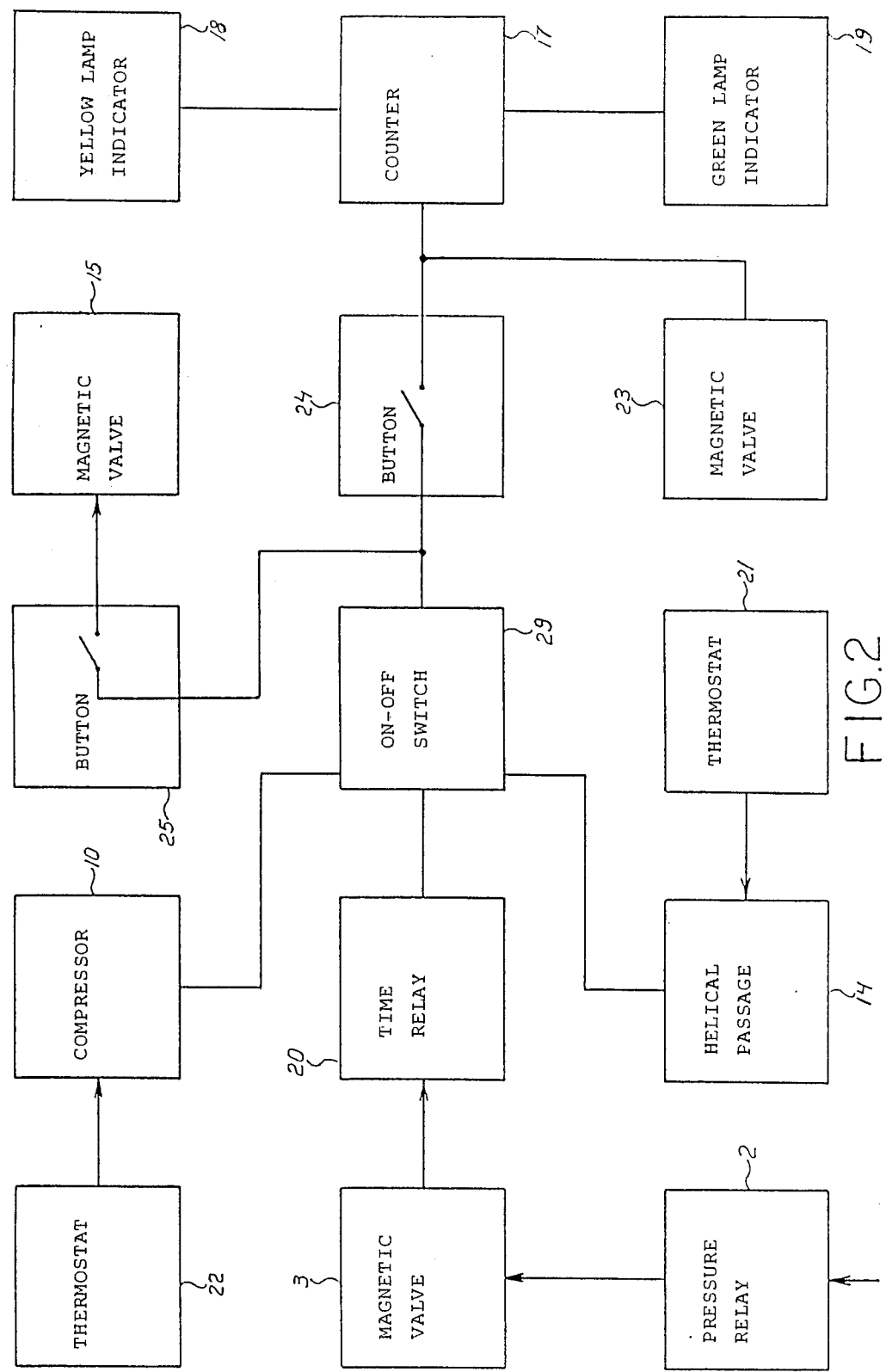
FIG. 2 is a block diagram of the silverizing device of FIG. 1.

The device in accordance with a first embodiment shown in FIGS. 1 and 2 has a pressure relay 2 operatively connected with a magnetic valve 3 cooperating with the plunger 4 for acting on an opening for draining 5 and a main passage 6. The latter leads to a filter 7. A cooling medium condensor 8 is connected through a cooling medium filter 9 with a compressor 10 having a cooling medium supply valve 11. A passage 12 is a starting part of an outer helical passage in the wall 31 for the cooling medium. The filter 7 is connected with a central helical passage 13 for water. An inner helical passage 14 is provided for accommodating a heating medium or wire.

A control panel 16 has a button polarity reversal 24 for activating the silverizing process, and a button 25 for acting on a magnetic valve 15 to allow passage of water without silverizing. The counter 17 counts the amount of used water by a user and after a certain amount has been used activates a yellow lamp indicator 18 to indicate that the device must be cleaned, or more particularly its electrodes must be cleaned.

The green lamp indicator signals that a standard dosage of silver saturates the water, and a user can drink this water. A time relays 20 operates the magnetic valve 3 to allow a desired amount of first water to be drained through the opening 5. A thermostat 21 determines the temperature of water and activates the heating medium 14 to heat the water. A thermostat 22 determines the temperature of water and activates the cooling medium system, as will be explained hereinbelow.

A magnetic valve 23 operates for supplying the water to the electrodes 32. The electrodes can be formed as alternatingly polarized silver electrodes connected with electrical conductors 30. A spring 26 cooperates with the plunger 3 for closing and opening the latter, as will also be explained hereinabove.

Figure 3:
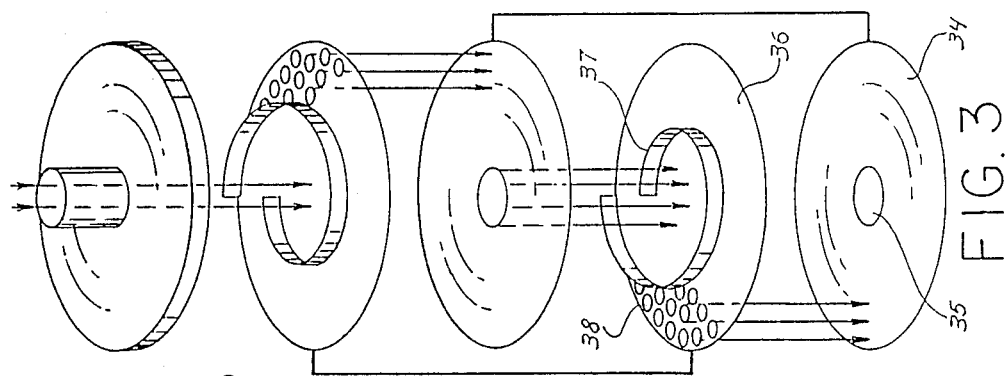
FIG. 3 is a view showing the arrangement of the electrodes of the device of FIG. 1.

A helical passage or pipe 13 of silverized water ends in a pipe 27 which connects the helical passage with an opening 35 of a lower electrode 34, and then water passes the the neighboring electrode 36 with the guide 37 and a plurality of openings 38. As shown in FIG.3, the flow of water can be in an opposite direction, namely downwardly.

The device has a housing 28 and an electrical push button relay or on-off switch 29.

When water is supplied into the device as identified with reference numeral 1 the pressure relay senses the water pressure and activates the time relay 20. The latter during 1-2 sec. allows the spring 26 to hold the plunger 4 so that the draining opening 5 is open and first water is drained. Then after the above time elapses the magnetic valve displaces the plunger so that the draining opening is closed and a supply opening 6 is opened. The water runs into the filter 7 in which it is mechanically (or in other ways) filtered. The filtered water then flows into the central spiral passage of the wall 31 which surrounds the electrodes 32, and then through a magnetic valve 23 which is open runs into schematically shown space between the electrodes 32. After being saturated with silver, the water leaves the devices through an outlet pipe 33.

If the water is too warm, the thermostat 22 activates the compressor 10 which through the cooling medium (freon) filter 9 and condensor 8 supplies the cooling medium through the passage 12 into the outer cooling medium passage of the wall 31. If however the water is too cold, the heating medium is supplied into the inner heating medium passage of the wall from a not shown source, or a heating wire in this passage can be heated electrically.

The device is started by pressing the electrical relay—29. By pressing the button 25 of non-silverized water the magnetic valve 15 is activated and provides a passage of the water without silverizing. In contrast, by pressing the button 24 the water is subjected to silverizing. The counter 17 counts the quantity of glasses of water produced by the device and after for example 500 glasses activates a yellow lamp indicator 18 which signals that the electrode must be cleaned. The green lamp indicator indicates that the standard dosage of silver is present in water and a user can drink the water.

The electrodes can include a plurality of pairs each having an electrode 34 with a central opening 35 and a neighboring electrode 36 with a guiding projection 37 and a plurality of openings 38.

The device shown in FIG. 4 is a cup to be used during travels, trip, and also in other situations. It has a housing 7, a cover 1 which is pivotable on a hinge 11 between a closed and an open position, a guide 9 formed as a pipe with perforated walls can be plastic, electrodes 45 and 46 located in the bottom region of the guide, and a float 4 moveable in the guide and having a height which corresponds to the height of the electrodes. Electrical conductors 3 extend inside a handle 8 and are connected with a switch 2 and a battery 6 with a time relay 5. A green lamp indicator 10 signals that a user can drink the water.

The housing is filled with water and the float 9 raises and switches on the switch 2 which activates through the time relay the battery 6. The latter supplies the electrodes and the electrodes during the time designated by the relay saturate the water with silver ions. The user opens the cover and drinks the water. When all water has been used, the float descends and occupies a space between the electrodes so that no current can pass between the electrodes when there is no water in the device. The float is composed of an electrically isolating material.

It should be emphasized that in the second embodiment of the invention shown in FIG.4, the device can also be provided with the same heating and cooling means which are alternatingly activated as in the first embodiment. Also the means for signalling a need of cleaning can be provided in the second embodiment as well.

The invention is not limited to the details shown since various modification and structural changes are possible without departing in any way from the spirit of the present invention.

What is desired to be protected by Letters Patent is set forth in particular in the appended claims.

We claim:

1. A device for silverizing drinking water, comprising a plurality of electrodes including electrodes composed of silver and connectable with an electrical source; means forming an inlet and an outlet arranged so that water passes from said inlet to said outlet near said electrodes to be saturated with silver ions; and means for maintaining a desired temperature of water and including means for cooling the water and means for heating the water, and means for alternatingly activating said cooling means and said heating means in response to sensing a temperature of water.

2. A device for silverizing water as defined in claim 1, wherein said activating means includes two thermostats arranged to sense the temperature of the water and each activating a respective one of said cooling means and heating means.

3. A device for silverizing water as defined in claim 1; and further comprising means forming a passage for passing the water from said inlet to said outlet, said cooling means and said heating means being arranged immediately adjacent to said passage so as to selectively cool or heat the water in said passage.

4. A device for silverizing water as defined in claim 3, wherein said means forming a passage includes a wall in which said passage is formed, said cooling means and said heating means being arranged in said wall at opposite sides of said passage so as to selectively cool or heat the water.

5. A device for silverizing water as defined in claim 1; and further comprising means for draining an initial portion of water being starting the silverizing of the water.

6. A device for silverizing water as defined in claim 5, wherein said draining means includes a draining opening, a closing element for closing an opening of said draining opening, and a time relay activating said closing element so that the latter opens said draining opening over a predetermined time.

7. A device for silverizing water as defined in claim 1; and further comprising means indicating a need in cleaning ssid electrodes.

8. A device for silverizing water as defined in claim 7, wherein said indicating means includes means for counting a quanity of water which has been silverized and consumed by a user, and a signalling element arranged to signal the need in cleaning in response to the counting by said counting means of a predetermined quantity of silverized and consumed water.

9. A device for silverizing water as defined in claim 1; and further comprising means for activating said electrodes upon filling the water to a predetermined level and including an activating switch and a float arranged to activate said switch upon filling the water to a predetermined level and therefore raising the float to said level.

10. A device for silverizing water as defined in claim 9, wherein said electrodes are located in a lower region and said float is composed of an electrically isolating material and movable in the absence of water in a space between said electrodes to separate the latter electrically.

11. A device for silverizing water as defined in claim 9; and further comprising a guide arranged to guide said float during its movement up and down and formed as a perforated guide.

* * * * *